(12) United States Patent
Schieber

(10) Patent No.: US 11,458,786 B2
(45) Date of Patent: Oct. 4, 2022

(54) POWERED TRAILER HITCH

(71) Applicant: Terry Schieber, Stanberry, MO (US)

(72) Inventor: Terry Schieber, Stanberry, MO (US)

( * ) Notice: Subject to any disclaimer, the term of this patent is extended or adjusted under 35 U.S.C. 154(b) by 130 days.

(21) Appl. No.: 16/987,483

(22) Filed: Aug. 7, 2020

(65) Prior Publication Data

US 2021/0046792 A1    Feb. 18, 2021

Related U.S. Application Data

(60) Provisional application No. 62/885,961, filed on Aug. 13, 2019.

(51) Int. Cl.
| | | |
|---|---|---|
| *B60D 1/24* | (2006.01) | |
| *B60D 1/46* | (2006.01) | |
| *B60D 1/06* | (2006.01) | |
| *B62D 53/08* | (2006.01) | |
| *B60D 1/54* | (2006.01) | |
| *B62D 33/02* | (2006.01) | |

(52) U.S. Cl.
CPC ............. *B60D 1/246* (2013.01); *B60D 1/065* (2013.01); *B60D 1/46* (2013.01); *B60D 1/54* (2013.01); *B62D 53/08* (2013.01); *B62D 33/02* (2013.01)

(58) Field of Classification Search
CPC .......... B60D 1/246; B60D 1/065; B60D 1/46; B60D 1/54; B60D 1/06; B62D 53/08; B62D 33/02
See application file for complete search history.

(56) References Cited

U.S. PATENT DOCUMENTS

| | | | |
|---|---|---|---|
| 3,891,239 A | 6/1975 | Leo et al. | |
| 4,148,499 A | 4/1979 | Johnson | |
| 4,564,209 A * | 1/1986 | Kingsley .................. | B60D 1/44 180/199 |
| 6,409,202 B1 * | 6/2002 | Putnam ..................... | B60D 1/06 280/495 |
| 6,776,431 B1 | 8/2004 | Dick | |
| 6,817,820 B2 | 11/2004 | Ackerman et al. | |
| 7,264,260 B2 | 9/2007 | Overstreet | |
| 10,252,590 B2 | 4/2019 | Jackson et al. | |
| 2003/0042708 A1 * | 3/2003 | Tambornino ............. | B60D 1/54 280/491.1 |
| 2004/0113390 A1 * | 6/2004 | Broussard, III ......... | B60D 1/06 280/415.1 |
| 2004/0227325 A1 * | 11/2004 | Colibert .................. | B60D 1/246 280/479.1 |
| 2004/0239074 A1 * | 12/2004 | Lindenman .............. | B60D 1/06 280/491.1 |
| 2009/0224511 A1 * | 9/2009 | Dick ........................ | B60D 1/54 280/511 |
| 2014/0339791 A1 * | 11/2014 | McCall ................... | B60D 1/485 280/491.5 |
| 2017/0136836 A1 | 5/2017 | Davis | |

* cited by examiner

*Primary Examiner* — Jacob D Knutson
*Assistant Examiner* — Abigail R Hymel
(74) *Attorney, Agent, or Firm* — Harness, Dickey & Pierce, P.L.C.

(57) ABSTRACT

A powered trailer hitch apparatus is provided. In one aspect, the apparatus includes a casing fixedly mounted to a frame of the vehicle and a ram at least partially disposed within the casing. The ram includes an extension member and a trailer-connecting member. The trailer-connecting member is external to the casing and fixed to an end of the extension member. The trailer-connecting member is configured to be selectively coupled to the trailer.

20 Claims, 8 Drawing Sheets

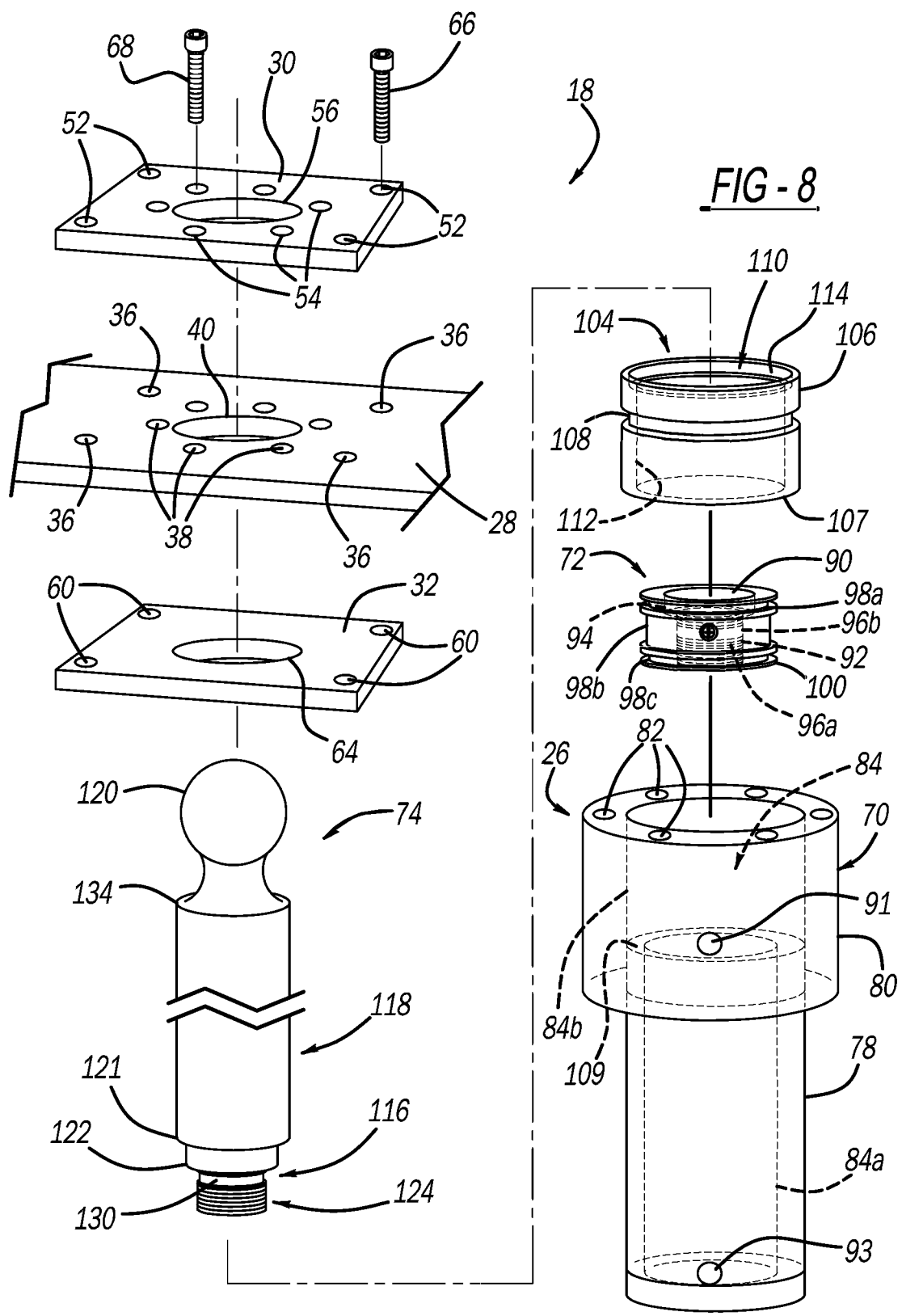

POWERED TRAILER HITCH

CROSS-REFERENCE TO RELATED APPLICATIONS

This application claims the benefit of U.S. Provisional Application No. 62/885,961, filed on Aug. 13, 2019. The entire disclosure of the above application is incorporated by reference herein.

BACKGROUND AND SUMMARY

This present disclosure generally relates to a trailer hitch and more particularly to a powered trailer hitch for selectively coupling a vehicle to a trailer.

Many different types of hitches are available for towing trailers. To accommodate various types and sizes of trailers, some hitches are vertically adjustable. Current hitches that are vertically adjustable include numerous sub-parts or sub-components that allow the hitches to vertically adjust. Furthermore, such components require extra storage and movement space within the towing vehicles and are overly complex, thus, more prone to failure. Exemplary traditional hitches are disclosed in U.S. Pat. No. 3,891,239 entitled "HYDRAULICALLY OPERATED HITCH FOR TOWING AND POSITIONING MOBILE HOMES," which issued to Leo et al. on Jun. 24, 1975, and U.S. Pat. No. 4,148,499 entitled "HYDRAULIC TRAILER LIFT," which issued to Johnson on Apr. 10, 1979. Both of these patents are incorporated by reference herein. The present disclosure provides a powered trailer hitch that is compact, minimizes components and overcomes the limitations present in conventional hitches.

In accordance with the present invention, a powered trailer hitch apparatus is provided. In one aspect, the apparatus includes a casing fixedly mounted to a frame of the vehicle and a ram at least partially disposed within the casing. Another aspect provides a ram is which is movable within a casing and includes a piston, an extension member and a trailer-connecting member. The piston is disposed within the casing and is attached to a first end of the extension member. The trailer-connecting member is attached to a second end of the extension member and is configured to be selectively coupled to the trailer. In another aspect, a centerline or longitudinal axis of a casing extends through a center of a trailer-connecting member. In a further aspect, a trailer-connecting member is directly above a casing. In still a further aspect, a powered trailing hitch apparatus selectively couples a vehicle having a cargo bed defining an opening, to a trailer.

The powered trailer hitch apparatus according to the present disclosure is advantageous over traditional devices. For example, the powered trailer hitch apparatus allows for easy installation in vehicles while utilizing very little storage space. Furthermore, the powered trailer hitch apparatus in the stowed position allows for access and use of the cargo area of the vehicle. Additional advantages and features of the present invention will be readily understood from the following description, claims and appended drawings.

BRIEF DESCRIPTION OF THE DRAWINGS

FIG. 8 is an exploded perspective view showing the powered trailer hitch apparatus.

DETAILED DESCRIPTION

Figure 1:
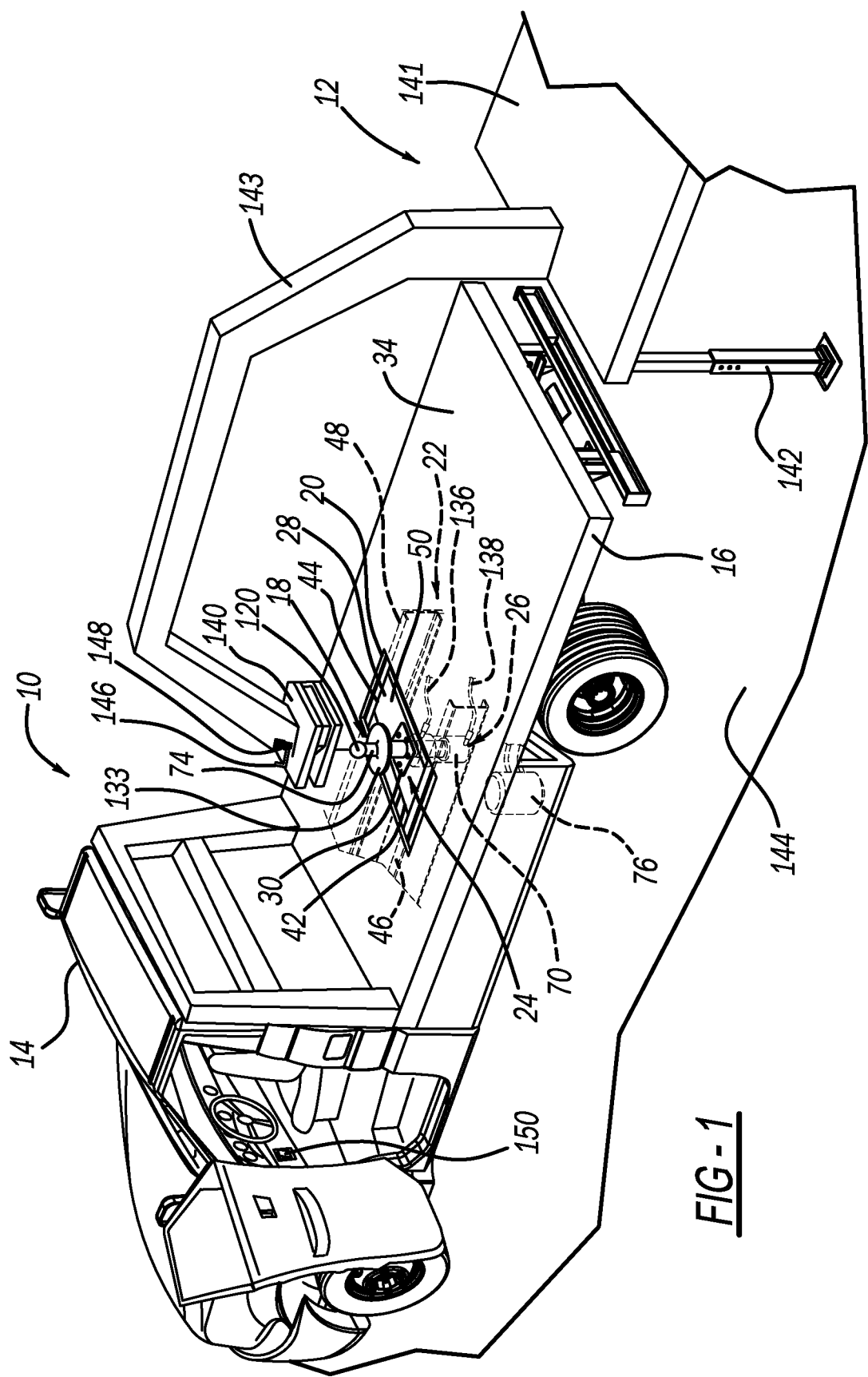
FIG. 1 is a perspective view showing a vehicle having a powered trailer hitch apparatus.

With reference to FIG. 1, an automotive vehicle 10 is preferably a flat bed or pick-up truck. Vehicle 10 is configured to haul or tow a trailer 12 such as a fifth-wheel trailer having a goose neck arm 143 which has a generally inverted U-shape forwardly extending over a portion of a cargo bed 16. The vehicle 10 includes a passenger cab 14, cargo bed 16 extending from an aft end of the cab 14 and powered trailer hitch apparatus 18. Cargo bed 16 defines a generally rectangularly-shaped opening 20 extending therethrough. In some configurations, opening 20 can alternately be circular, square, or any other suitable shape. Furthermore, opening 20 is defined at or near a middle portion of cargo bed 16 such that opening 20 is inwardly spaced from a periphery of cargo bed 16.

FIGS. 1-8 show powered trailer hitch apparatus 18 attached to a frame 22 of vehicle 10 and the hitch apparatus 18 is configured to be selectively coupled to goose neck arm 143 of trailer 12. Trailer hitch apparatus 18 includes an attachment assembly 24 and a hydraulic actuator assembly 26. More specifically, FIGS. 5-8 illustrate attachment assembly 24, which includes an elongated first plate 28, a second plate 30 and a third plate or end cap 32. The first, second and third plates 28, 30, 32 are made of a metallic material such as steel. First plate 28 has a generally U-shaped cross-section and extends perpendicularly relative to a longitudinal (fore-and-aft) length of the cargo bed 16. First plate 28 is disposed entirely below cargo bed 16 and is accessible from a top surface 34 of cargo bed 16 via opening 20. As shown in FIG. 8, first plate 28 includes first apertures 36, second apertures 38 and a central opening 40. Second apertures 38 are disposed around central opening 40 and between central opening 40 and first apertures 36. First plate 28 also has opposing ends 42, 44 that are attached (e.g., welded) to frame 22 of vehicle 10. That is, end 42 is attached to rail 46 of frame 22 that extends along a longitudinal direction of vehicle 10 and end 44 is attached to rail 48 of frame 22 that also extends along the longitudinal direction of vehicle 10.

Second plate 30 is rectangularly-shaped and is attached to first plate 28 (FIGS. 5-8; second plate 30 abuts against an upper surface 50 of first plate 28). Second plate 30 includes first apertures 52, second apertures 54 and central opening 56. Each first aperture 52 is positioned at a respective corner of second plate 30 and is vertically aligned with a corresponding first aperture 36 of first plate 28. As shown in FIG. 8, second apertures 54 are disposed around central opening 56 and between central opening 56 and first apertures 52. Each second aperture 54 is also vertically aligned with a corresponding second aperture 38 of first plate 28. Central opening 56 is vertically aligned with central opening 40 of first plate 28.

Third plate 32 is rectangularly-shaped and is attached to first plate 28 (third plate 32 abuts against a lower surface 58 of first plate 28 that is opposite upper surface 50). Third plate 32 includes first apertures 60 and central opening 64. Moreover, each first aperture 60 is vertically aligned with corresponding apertures 36, 52 of first and second plates 28, 30, respectively. Fasteners 66, such as threaded bolts, extend through apertures 36, 52, 60 of first, second and third plates 28, 30, 32, respectively, thereby securing first, second and third plates 28, 30, 32 to each other. Central opening 64 is also vertically aligned with openings 40, 56 of first and second plates 28, 30, respectively.

As can be observed in FIGS. 1 and 5-8, hydraulic actuator assembly 26 includes a hydraulic cylinder or casing 70, a piston 72, a ram 74 and a hydraulic reservoir or tank 76. Hydraulic cylinder 70 includes a first or lower portion 78 and a second or upper portion 80. Upper portion 80 has a thickness that is greater than a thickness of lower portion 78. As shown in FIG. 8, upper portion 80 also includes a plurality of apertures 82 formed therein. Each aperture 82 is vertically aligned with corresponding apertures 38, 54 of first and second plates 28, 30, respectively. Fasteners 68 extend through apertures 38 of first plate 28, apertures 54 of second plate 30 and apertures 82 of cylinder 70, thereby securing hydraulic cylinder 70 and first and second plates 28, 30 to each other.

As shown in FIG. 8, hydraulic cylinder 70 also includes a stepped opening 84. Stepped opening 84 has a first inner cylindrical surface 84a and a larger diameter second inner cylindrical surface 84b. First inner cylindrical surface 84a is disposed below second inner cylindrical surface 84b.

Piston 72 is cylindrically-shaped and is attached to ram 74. Piston 72 is movable between a first position (i.e., stowed position) in which ram 74 is positioned below the top surface 34 of cargo bed 16 and a second position (i.e., deployed position) in which ram 74 extends upwardly past the top surface 34 of cargo bed 16. Piston 72 is disposed within cylinder 70 and divides cylinder 70 into an upper working chamber 86 and a lower working chamber 88. A first port 91 extends through upper portion 80 of hydraulic cylinder 70 and is fluid communication with upper working chamber 86. A second port 93 extends through the lower portion 78 of the hydraulic cylinder 70 and is in fluid communication with the lower working chamber 88. Piston 72 includes a stepped opening 90 that has a first inner cylindrical surface 92 and a larger diameter second inner cylindrical surface 94. First inner cylindrical surface 92 is disposed below second inner cylindrical surface 94 and has a threaded portion 96a and an unthreaded portion 96b. Piston 72 also includes a plurality of annular-shaped grooves 98a, 98b, 98c formed in an outer cylindrical surface 100 of piston 72.

An annular-shaped sealing member is disposed within groove 98a and is sealingly engaged with first inner cylindrical surface 84a of cylinder 70. Sealing member disposed within groove 98a can be an O-ring, for example, and prevents hydraulic fluid in lower working chamber 88 from leaking into upper working chamber 86. Similarly, an annular-shaped sealing member is disposed within groove 98c and is sealingly engaged with first inner cylindrical surface 84a of cylinder 70. Sealing member disposed within groove 98c can be an O-ring, for example, and prevents hydraulic fluid in upper working chamber 86 from leaking into lower working chamber 88.

A gland 104 is cylindrically-shaped and is attached to cylinder 70. For example, gland 104 is press-fit into stepped opening 84 of cylinder 70 such that an outer cylindrical surface 106 of gland 104 contacts second inner cylindrical surface 84b, and an axial end surface 107 of gland 104 is seated on an annular surface 109 of cylinder 70. An annular-shaped groove 108 is formed in outer cylindrical surface 106 of gland 104. An annular-shaped sealing member is disposed within groove 108 and is sealingly engaged with second inner cylindrical surface 84b of cylinder 70. Sealing member disposed within groove 108 can be an O-ring, for example, and prevents hydraulic fluid in upper working chamber 86 from leaking out cylinder 70.

Gland 104 also includes a stepped opening 110. Stepped opening 110 has a first inner cylindrical surface 112 and a larger diameter second inner cylindrical surface 114. First inner cylindrical surface 112 is disposed below second inner cylindrical surface 114.

Ram 74 is made of a metallic material, such as steel, and extends through openings 40, 56, 64, 110 of plates 28, 30, 32 and gland 104, respectively, and at least partially through opening 84 of cylinder 70. Ram 74 is movable in a vertical direction within openings 40, 56, 64, 84, 110. Ram 74 includes a piston-connecting member 116, an extension member 118 and a trailer-connecting member 120. Piston-connecting member 116 is integral with and extends from an end 121 of extension member 118. Piston-connecting member 116 includes a first portion 122 and a second portion 124.

First portion 122 is cylindrically-shaped and extends from end 121 of extension member 118. Second portion 124 is cylindrically-shaped and extends from an end of first portion 122. Second portion 124 is partially threaded. Threads of second portion 124 are engaged with threaded portion 96a of piston 72, thereby securing ram 74 and piston 72 to each other. When ram 74 and piston 72 are secured to each other, cylindrical surface of first portion 122 of piston-connecting member 116 contacts (i.e., abuts against) second inner cylindrical surface 94 of piston 72. An annular-shaped groove 130 is formed in second portion 124 and is unthreaded. Groove 130 cooperates with unthreaded portion 96b of stepped opening 90 of piston 72, thereby facilitating attachment of ram 74 and piston 72.

As shown in FIGS. 1-7, an annular-shaped flange 133 is fixedly engaged with and extends radially outwardly from extension member 118. Flange 133 has an area that is smaller than an area of opening 20 such that flange 133 is able to move in and out of opening 20. Flange 133 acts as a stop to restrict vertical movement of ram 74. For example, flange 133 is configured to contact second plate 30 to restrict further vertical movement of ram 74 downwardly. In another example, flange 133 is configured to contact trailer 12 to restrict further vertical movement of ram 74 upwardly.

Trailer-connecting member 120 is integral with and extends from end 134 of extension member 118 that is opposite end 121. As shown in FIGS. 1-8, trailer-connecting member 120 is a hitch ball. Trailer-connecting member 120 is selectively coupled to trailer 12 and is directly above cylinder 70. A centerline or longitudinal axis of cylinder 70 extends through a center of trailer-connecting member 120.

Returning to FIG. 1, tank 76 is associated with vehicle 10 and includes hydraulic fluid contained therein. A first cable 136 is in fluid communication with tank 76 and is in fluid communication with upper working chamber 86 (via port 91). A second cable 138 is in fluid communication with tank 76 and is in fluid communication with lower working chamber 88 (via port 93).

Figure 2:
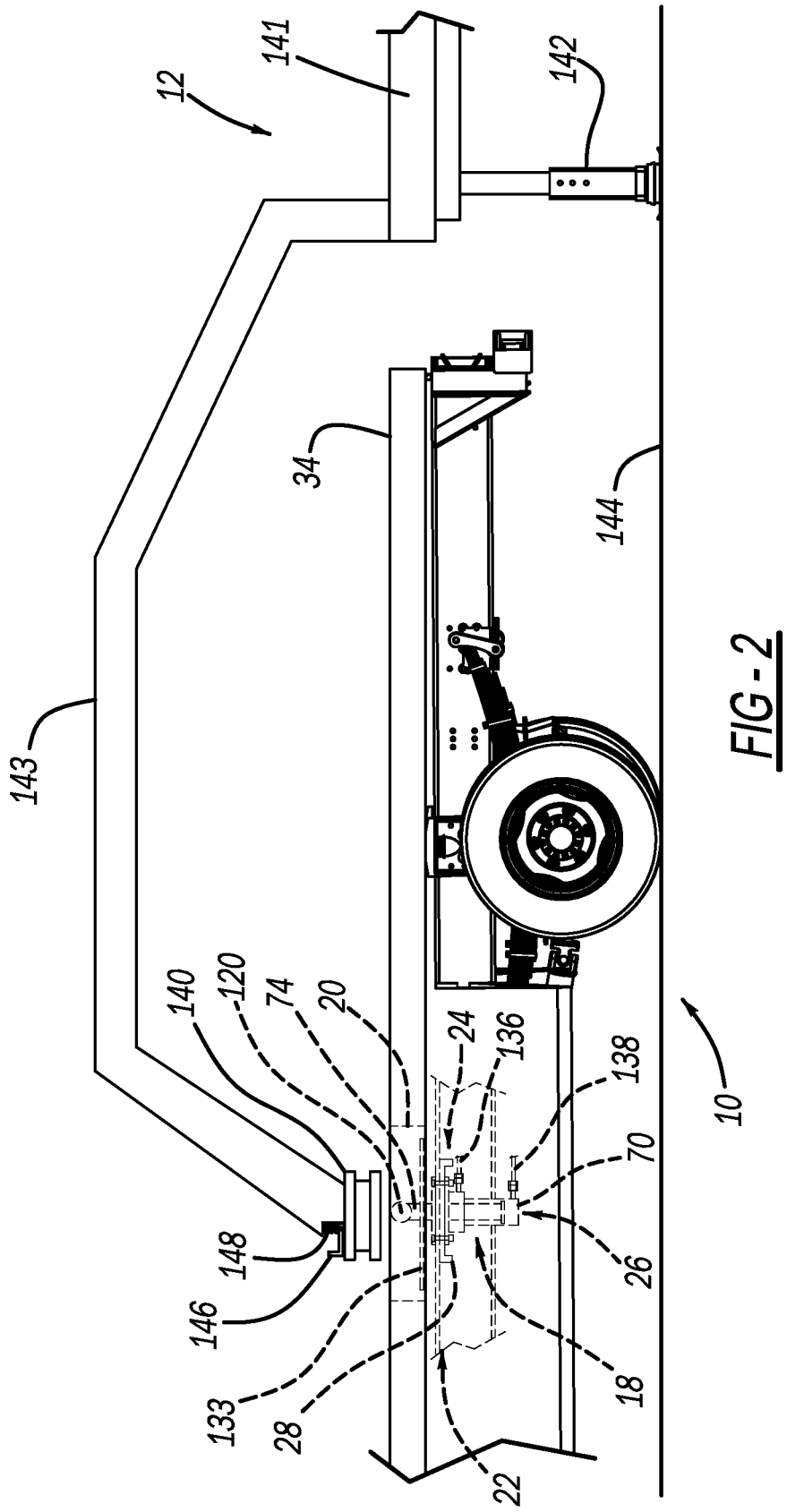
FIG. 2 is a side elevational view showing a cargo bed of the vehicle of FIG. 1 having the powered trailer hitch apparatus in a stowed position and decoupled from the trailer.
Figure 3:
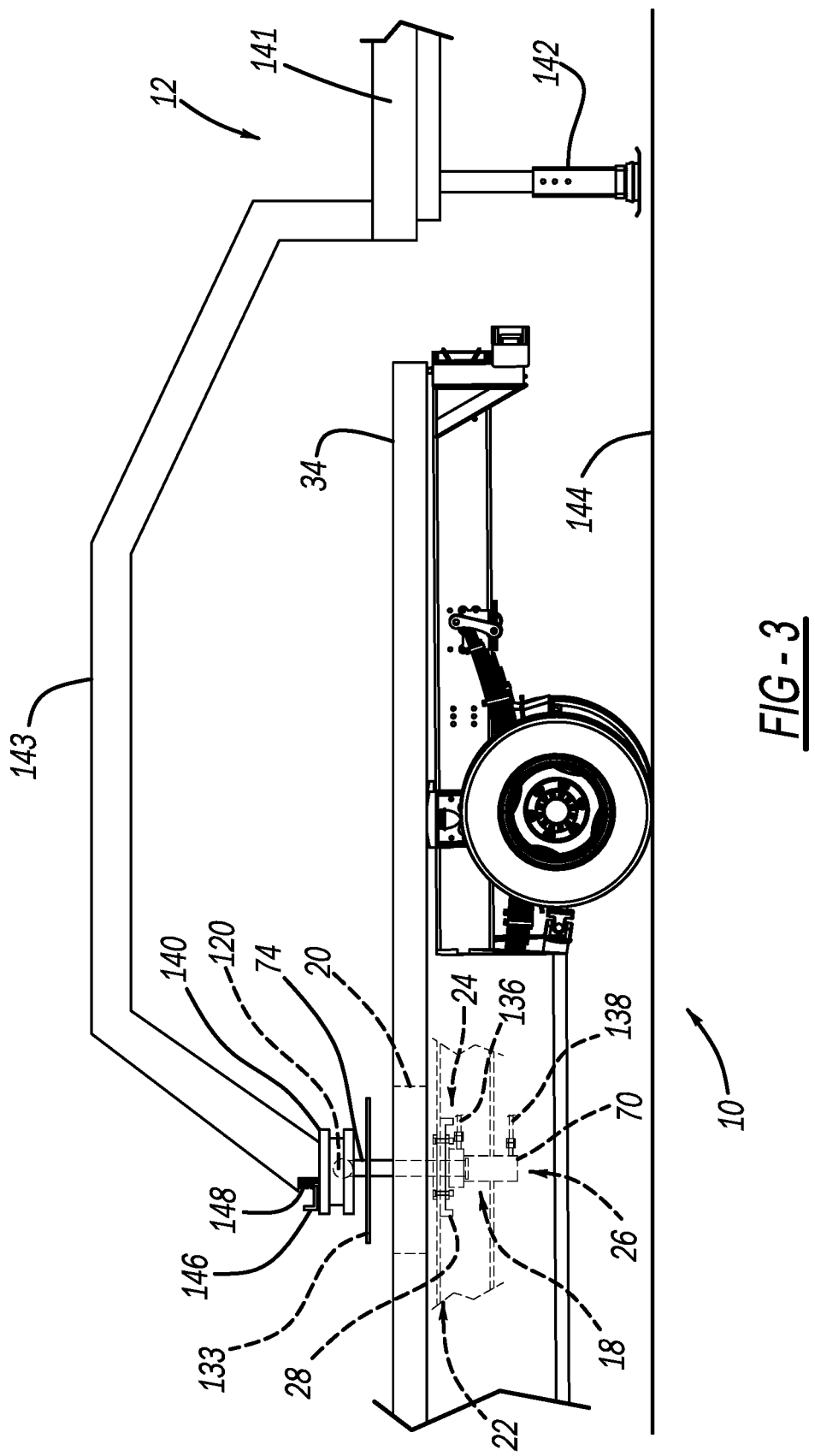
FIG. 3 is a side elevational view showing the cargo bed of the vehicle of FIG. 1 having the powered trailer hitch apparatus in an intermediate position moving toward a trailer.

Attachment of the hydraulic actuator assembly 26 to trailer 12 will now be described in detail. First, as shown in FIGS. 1 and 2, a user positions vehicle 10 such that trailer-connecting member 120 is vertically aligned with a coupler 140 of trailer 12. Coupler 140 is positioned away from a body 141 of trailer 12 via goose neck arm 143 and coupler 140 is also spaced apart from cargo bed 16. One or more legs 142 of trailer 12 are deployed (i.e., contacting a ground surface 144) to support trailer 12.

Figure 4:
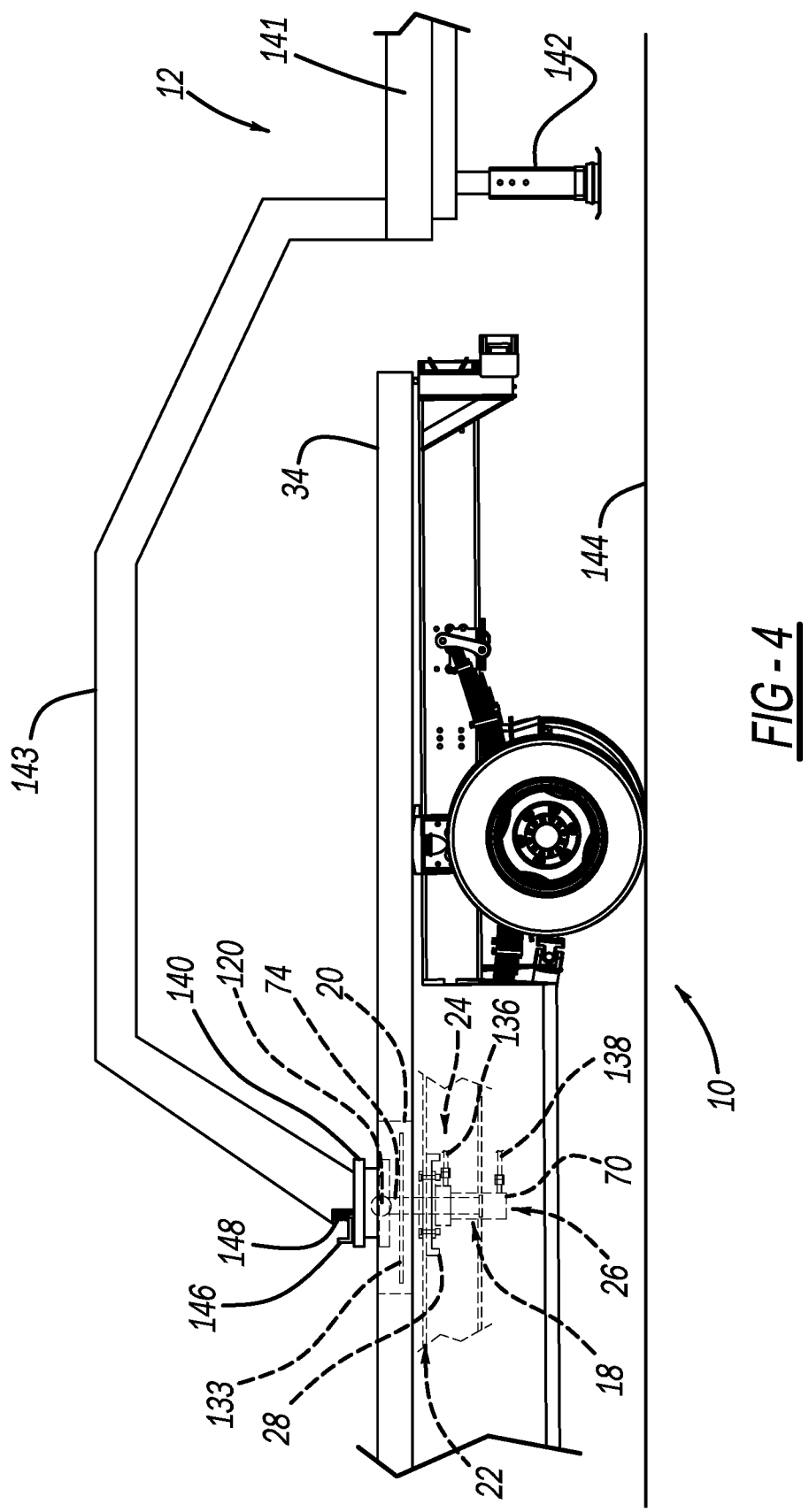
FIG. 4 is a side elevational view showing the cargo bed of the vehicle of FIG. 1 having the powered trailer hitch coupled to the trailer.
Figure 5:
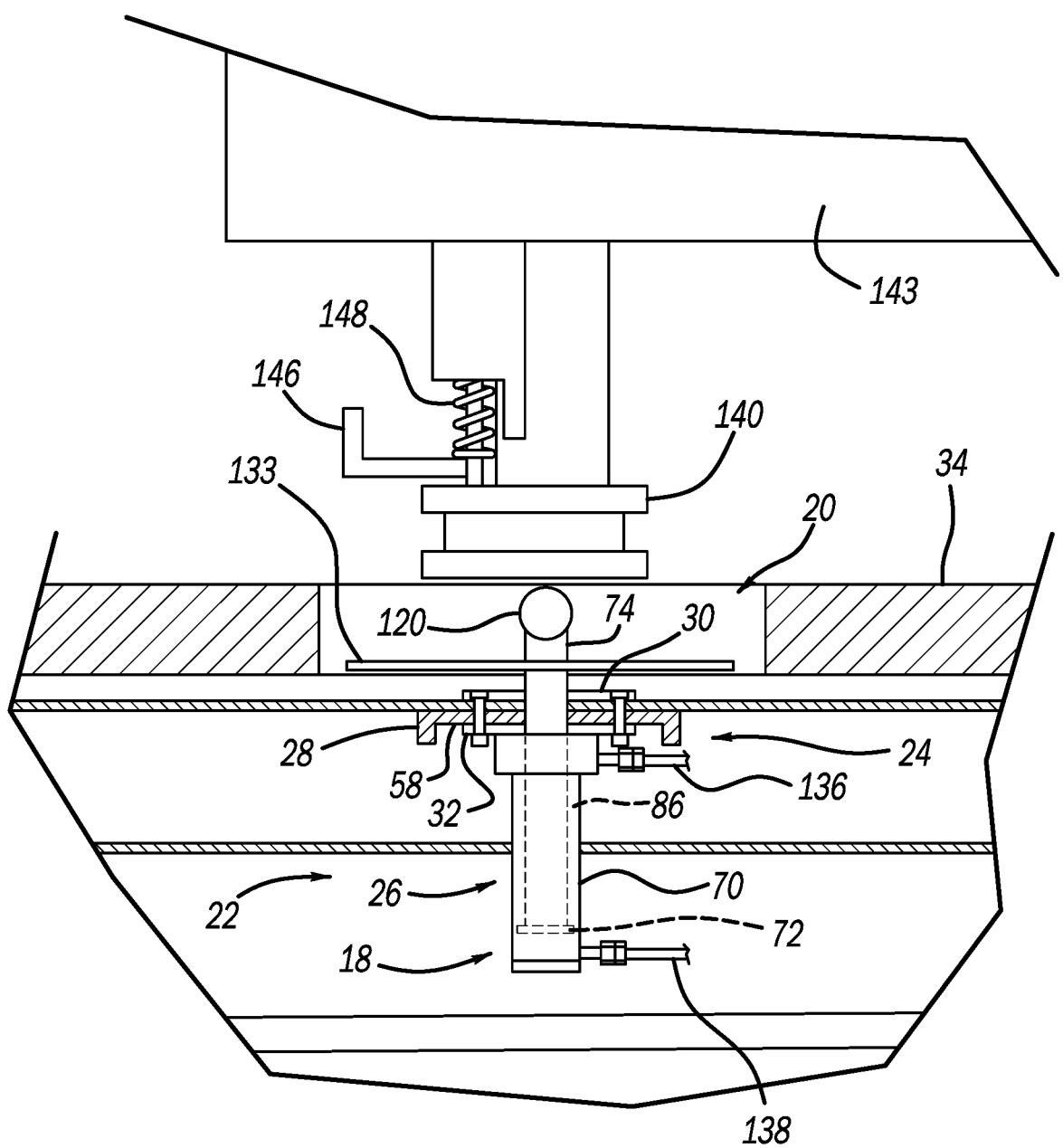
FIG. 5 is a partially fragmentary side view showing the powered trailer hitch apparatus in the stowed position.
Figure 6:
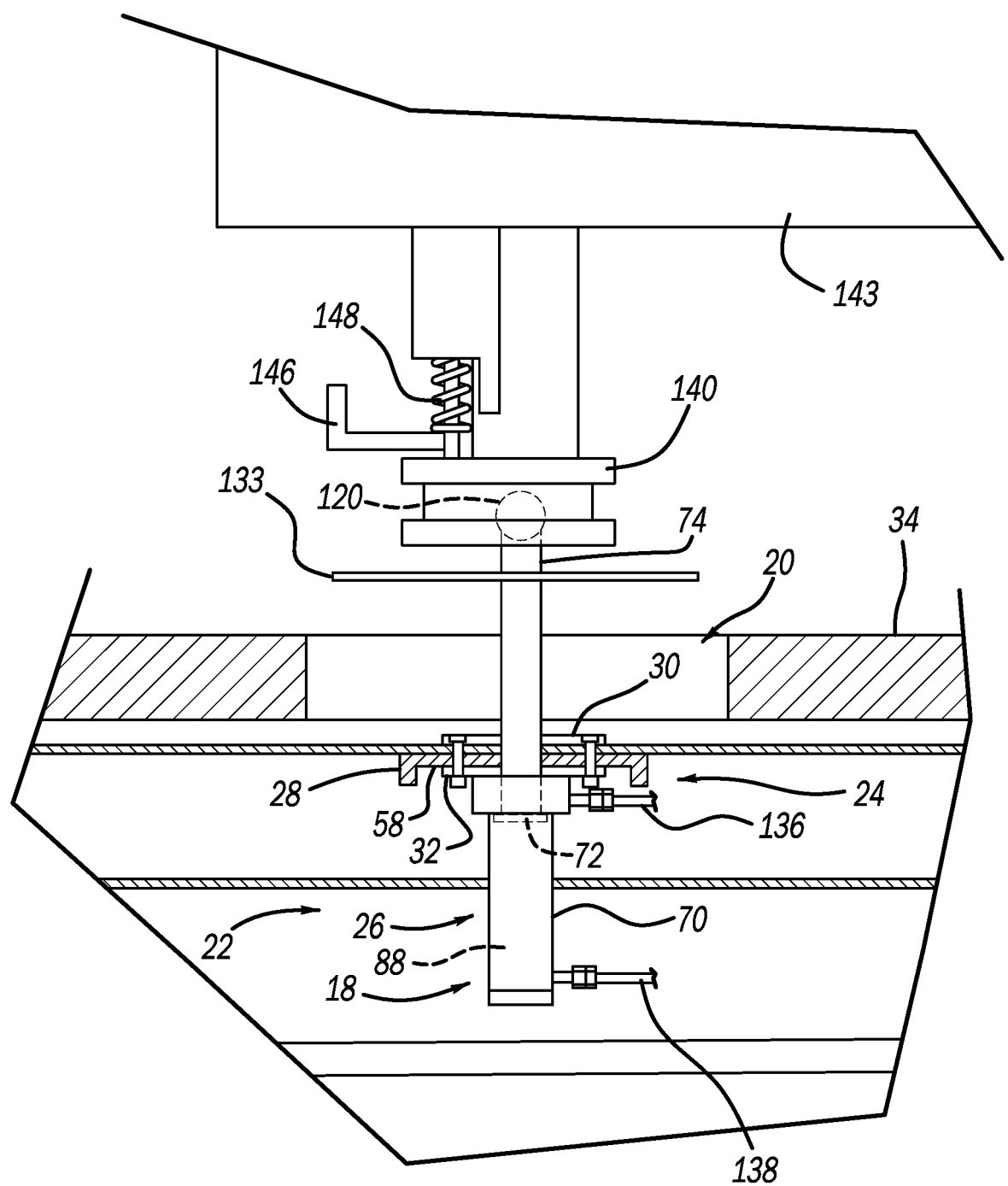
FIG. 6 is a partially fragmentary side view showing the powered trailer hitch apparatus in the intermediate position moving toward the trailer.
Figure 7:
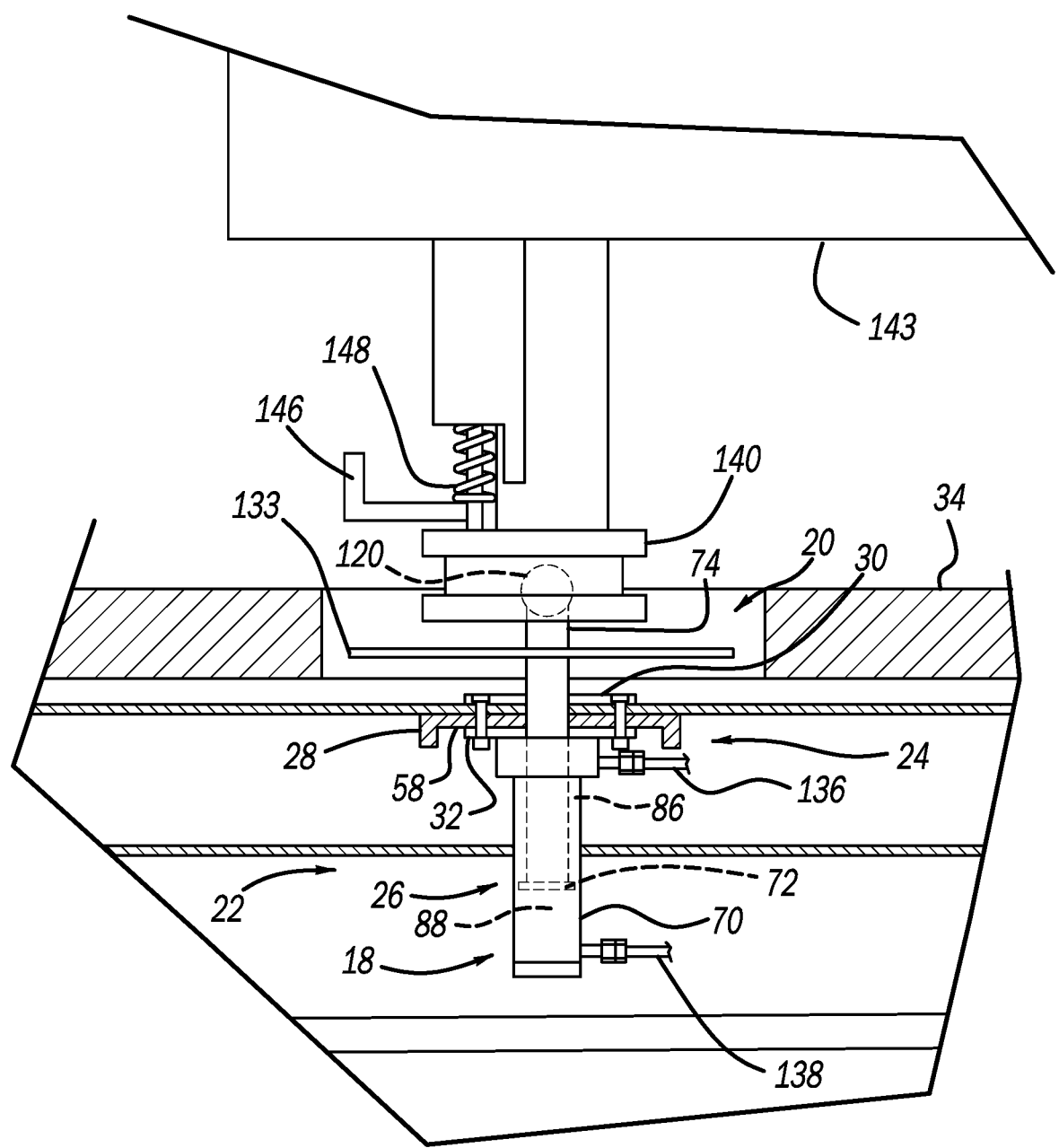
FIG. 7 is a partially fragmentary side view showing the powered trailer hitch apparatus coupled to the trailer.

Next, a handle 146 of trailer 12 is actuated by the user, which causes a screw rod 148 to move a latching or clamping mechanism of coupler 140 to an unlatched position. The latching mechanism can include two clamping or claw members that are moved away from each other in the unlatched position. One exemplary latching or clamping mechanism is disclosed in U.S. Pat. No. 6,776,431 entitled "FIFTHWHEEL TRAILER TO GOOSENECK HITCH ADAPTOR," which issued to Dick on Aug. 17, 2004 and is incorporated by reference herein. The user then actuates a switch 150 inside cab 14 of vehicle 10 to cause hydraulic fluid to flow from tank 76 to lower working chamber 88 (via cable 138), which, in turn, forces piston 72 and ram 74 to move upwardly. Once trailer-connecting member 120 is positioned within coupler 140 (FIGS. 3 and 6), the user actuates handle 146 of trailer 12 to move the latching mechanism to the latched position. The two clamping members of the latching mechanism are moved toward each other in the latched position such that the two clamping members clamp onto trailer-connecting member 120, thereby attaching trailer 12 to vehicle 10. Legs 142 of trailer 12 can be stowed as vehicle 10 now supports trailer 12. The user then actuates switch 150 to cause the hydraulic fluid to flow from tank 76 to upper working chamber 86 (via cable 136), which, in turn, forces piston 72 and ram 74 to move downwardly until trailer-connecting member 120 and coupler 140 attached thereto are positioned within opening 20 (FIGS. 4 and 7).

To detach vehicle 10 from trailer 12, the user first actuates switch 150 inside cab 14 of vehicle 10 to cause hydraulic fluid to flow from tank 76 to lower working chamber 88 (via cable 138), which, in turn, forces piston 72 and ram 74 to move upwardly. Once coupler 140 and trailer-connecting member 120 are removed from opening 20, legs 142 of the trailer 12 are deployed. The user then actuates handle 146 to move the latching mechanism of coupler 140 from the latched position to the unlatched position. Finally, the user actuates switch 150 to cause the hydraulic fluid to flow from tank 76 to upper working chamber 86 (via cable 136), which, in turn, forces piston 72 and ram 74 to move downwardly until trailer-connecting member 120 is positioned within opening 20 or below coupler 140.

While various embodiments have been disclosed, other variations are envisioned. For example, piston 72 may be integrally formed with ram 74 as opposed to threadably attached to ram 74. First inner cylindrical surface 92 of stepped opening 90 may be threaded throughout as opposed to having unthreaded portion 96*b*. Similarly, outer cylindrical surface 128 of piston-connecting member 116 may be threaded throughout as opposed to having groove 130 that is unthreaded. A cap may cover opening 20 in cargo bed 16 when ram 74 is stowed, thereby permitting access and use of cargo bed 16. Variations are not to be regarded as a departure from the present disclosure, and all such modifications are entitled to be included within the scope and spirit of the present invention.

What is claimed is:

1. A powered trailer hitch apparatus for selectively coupling a vehicle to a trailer, the apparatus comprising:
   a casing fixedly mounted to a frame of the vehicle with plates vertically sandwiching a portion of the frame such that a first plate is positioned vertically below the portion of the frame and a second plate is positioned vertically above the portion of the frame; and
   a ram at least partially disposed within the casing and movable relative to the casing, the ram including a trailer-connecting member and an extension member at least partially disposed within the casing, the trailer-connecting member being positioned external to the casing and fixed to an end of the extension member, and the trailer-connecting member being configured to be selectively coupled to the trailer,
   wherein a longitudinal axis of the casing extends through the trailer-connecting member.

2. The apparatus of claim 1, further comprising:
   a piston being vertically movable within the casing, the ram being coupled to and movable with the piston; and
   a flange laterally extending a dimension that is greater than an associated outside dimension of the casing, and the flange being affixed to the extension member between the trailer-connecting member and the casing.

3. The apparatus of claim 1, further comprising a bed coupled to the frame, the bed including a substantially flat cargo-carrying upper surface, the bed having an opening therein inwardly spaced from a periphery of the bed, and the extension member and the trailer-connecting member being vertically movable in and out of the opening of the bed.

4. The apparatus of claim 1, further comprising a cab of the vehicle being coupled to the frame in front of a bed, and a switch located within the cab causing the ram to vertically move.

5. The apparatus of claim 1, further comprising a flange laterally extending substantially perpendicular to an elongated direction of the ram, the flange laterally extending a dimension that is greater than an associated outside dimension of the casing, an upper surface of the flange being substantially flat, and the flange being affixed to the extension member between the trailer-connecting ball and the casing.

6. The apparatus of claim 1, further comprising threaded fasteners stationarily attaching the casing to the first and second plates, and the first and second plates to the frame.

7. The apparatus of claim 1, further comprising a goose neck arm removably coupling a trailer to the trailer-connecting ball in a fifth-wheel arrangement.

8. A powered trailer hitch apparatus for selectively coupling a vehicle to a trailer, the apparatus comprising:
   a piston being vertically movable relative to the vehicle;
   a vertically elongated ram being movable with the piston;
   a trailer-connector coupled to the ram;
   a bed coupled to the vehicle, the bed including a substantially flat cargo-carrying upper surface, the bed having an opening therein defined by a closed inner edge inwardly spaced from a periphery of the bed;
   an upper portion of the ram and the trailer-connector being vertically movable in and out of the opening of the bed; and
   a flange laterally extending a dimension that is greater than an associated outside dimension of the piston, the flange being affixed to the ram between the trailer-connector and the piston, and the flange being movable in and out of the opening of the bed in correspondence to movement of the ram.

9. The apparatus of claim 8, wherein the flange acts as an upper stop and a lower stop.

10. The apparatus of claim 8, wherein the opening in the bed is polygonal shaped and forward of rearmost wheels of the vehicle.

11. The apparatus of claim 8, further comprising a cab of the vehicle being coupled to a frame in front of the bed, the bed being coupled to the frame, and a switch located within the cab causing the piston to vertically move.

12. The apparatus of claim 8, further comprising plates sandwiching a portion of a frame therebetween with threaded fasteners stationarily attaching a casing to the plates and the plates to the frame, the bed being coupled to the frame, and the piston being moveable within the casing.

13. The apparatus of claim 8, further comprising a goose neck arm removably coupling a trailer to the trailer-connector in a fifth-wheel arrangement.

14. The apparatus of claim 8, further comprising a casing affixed to a frame of the vehicle below a middle portion of the bed, the piston is fluidically moved within the casing in a vertical direction, and the trailer-connector is a ball.

15. The apparatus of claim 8, wherein a trailer-connector ball is below the upper surface of the bed when the ball is in a retracted position, and the ball is coaxially above the ram and the piston in raised and retracted position.

16. The apparatus of claim 8, further comprising a bottom portion of the ram is threaded for engagement with the piston, and an upper section of the casing has a greater outside lateral dimension than a bottom section of the casing.

17. The apparatus of claim 8, wherein the piston includes a stepped opening that receives the ram, the stepped opening has a first inner cylindrical surface including threads, and a second inner cylindrical surface extending a lateral dimension that is greater than an associated lateral dimension of the first inner cylindrical surface.

18. A powered trailer hitch apparatus for selectively coupling a vehicle to a trailer, the apparatus comprising:

a casing fixedly mounted to a frame of the vehicle using plates sandwiching a portion of the frame;

a piston being vertically movable inside the casing;

a vertically elongated ram being movable with the piston;

a trailer-connecting ball coupled to the ram, the ball being coaxially above the ram and the casing in raised and retracted positions;

a bed coupled to the frame, the bed including a substantially flat cargo-carrying upper surface located above the frame, the bed having an opening in a middle portion thereof defined by a closed inner edge inwardly spaced from a periphery of the bed;

the trailer-connecting ball being vertically movable in and out of the opening of the bed such that in the retracted position, the trailer-connecting ball is below the upper surface of the bed;

the piston always being located below the middle portion of the bed;

a flange laterally extending substantially parallel to the upper surface of the bed, the flange laterally extending a dimension that is greater than an associated outside dimension of the casing, the flange being affixed to the ram between the trailer-connecting ball and the casing, and the flange being movable in and out of the opening of the bed in correspondence to movement of the ram between the retracted and raised positions;

a cab of the vehicle being coupled to the frame in front of the bed; and a switch located within the cab causing fluid to move the piston.

19. The apparatus of claim 18, further comprising a goose neck arm removably coupling a trailer to the trailer-connecting ball in a fifth-wheel arrangement.

20. The apparatus of claim 18, wherein:

the opening in the bed is polygonal shaped and forward of rearmost wheels of the vehicle; and the flange is attached to the ram, and the flange acts as an upper stop when the flange moves to contact the trailer and a lower stop when the flange moves to contact the plates.

* * * * *